United States Patent [19]
Johnson

[11] Patent Number: 5,540,147
[45] Date of Patent: Jul. 30, 1996

[54] METHOD FOR FORMING A CONTOURED PLANARIZING LAYER FOR A COLOR FILTER

[75] Inventor: Ronald E. Johnson, Tioga, Pa.

[73] Assignee: Corning Incorporated, Corning, N.Y.

[21] Appl. No.: 385,699

[22] Filed: Feb. 8, 1995

Related U.S. Application Data

[63] Continuation-in-part of Ser. No. 348,597, Dec. 2, 1994, abandoned.

[51] Int. Cl.$^6$ .............................. B41M 1/20; B41M 1/34; B41L 23/00
[52] U.S. Cl. .............................. 101/211; 101/34; 101/35; 101/151; 101/170; 101/416.1; 101/424.1; 156/235; 156/240; 156/275.5; 156/277; 427/165; 427/269; 427/278
[58] Field of Search ................................... 101/33, 34, 35, 101/36, 38.1, 41, 150–154, 163, 170, 171, 175, 176, 211, 217, 424.1, 424.2, 416.1, 450.1, 483, 487, 488, 491, DIG. 43; 156/235, 240, 277, 275.5; 427/162, 165, 269, 277, 278, 287

[56] References Cited

U.S. PATENT DOCUMENTS

| | | | |
|---|---|---|---|
| 4,035,214 | 7/1977 | Shuppert et al. | 156/240 |
| 4,209,551 | 6/1980 | Masaki et al. | 101/35 |
| 4,445,432 | 5/1984 | Ford et al. | 101/152 |
| 4,549,928 | 10/1985 | Blanding et al. | 156/660 |
| 5,127,330 | 7/1992 | Okazaki et al. | 101/450.1 |
| 5,166,126 | 11/1992 | Harrison et al. | 427/266 |
| 5,190,794 | 3/1993 | Yoshino et al. | 427/162 |
| 5,201,268 | 4/1993 | Yamamoto et al. | 101/170 |
| 5,399,374 | 3/1995 | Sumi et al. | 427/162 |

FOREIGN PATENT DOCUMENTS

| | | | |
|---|---|---|---|
| 61-284441 | 12/1986 | Japan | 101/424.1 |
| 62-280805 | 12/1987 | Japan . | |
| 62-280804 | 12/1987 | Japan . | |
| 2-175252 | 7/1990 | Japan . | |
| 264503 | 9/1992 | Japan . | |
| 5-147359 | 6/1993 | Japan . | |

OTHER PUBLICATIONS

Katsuhiko Mizuno and Satoshi Okazaki, "Printing Color Filter for Active Matrix Liquid–Crystal Display Color Filter", Nov., 1991, Japanese Journal of Applied Physics, vol. 30, No. 11B, pp. 3313–3317.

Primary Examiner—Stephen Funk
Attorney, Agent, or Firm—Robert L. Carlson

[57] ABSTRACT

A method and apparatus for making contoured planarizing or protective layers for color filters for liquid crystal display panels. A transfer layer is formed on a collector device having a contoured surface. A plurality of colored ink patterns is formed on the transfer layer thereby forming the multicolor image that will become the color filter. This multicolored image is then transferred to the substrate so that the transfer layer in effect becomes a top protective layer or planarizing layer. The contoured surface on the collector device is imparted to the planarizing layer.

14 Claims, 5 Drawing Sheets

METHOD FOR FORMING A CONTOURED PLANARIZING LAYER FOR A COLOR FILTER

RELATED APPLICATIONS

This application is a Continuation-In-Part of U.S. patent application Ser. No. 08/348,597, filed on Dec. 2, 1994, titled "Method and Apparatus for Forming a Contoured Planarizing Layer for a Color Filter, now abandoned."

FIELD OF THE INVENTION

The invention relates to color filters for liquid crystal display panels, and methods for their production.

BACKGROUND OF THE INVENTION

Liquid crystal display panels (LCDS), particularly color LCD panels, are used for flat screen televisions, projection television systems and camcorder view finders, with many more applications anticipated in the future.

The fabrication of an active matrix liquid crystal display involves preparation of a front and rear glass panel. Preparation of the front glass panel involves deposition of a color filter element onto a suitable substrate, such as glass. Color filter deposition typically involves depositing a black matrix pattern and three primary (typically either red, green and blue or yellow, magenta and cyan) color dot or color cell patterns within the spaces outlined by the black matrix. The lines which form the black matrix typically are about 15-25 microns wide and about 0.5 to 2 microns thick. The red, green, and blue color cells are typically on the order of about 70–100 microns in width by 200 to 300 microns in length. The printed color cells are typically less than about 10 microns thick, and preferably less than 5 microns thick, and must be evenly applied and accurately registered within the pattern formed by the black matrix. The front glass substrate is typically completed by depositing a planarizing layer, a transparent conducting layer, and a polyamide alignment layer over the color filter element. The transparent conducting layer is typically indium tin oxide (ITO), although other materials can also be utilized.

Preparation of the rear glass panel involves formation of thin film transistors or diodes, as well as metal interconnect lines. Each transistor acts as an on-off switch for an individual color pixel in the display panel. The third and final step is the assembly of the two panels, including injection of a liquid crystal material between the two panels to form the liquid crystal display panel.

One critical step in color filter formation is the formation of the red, green and blue color dots (also referred to as color cells) of the color filter. Such color cells preferably should be deposited so that they are as smooth and uniform in thickness as possible. Previous ink printing methods used to print color filter patterns have resulted in color patterns having insufficient smoothness. This is largely because the ink depositing methods of the prior art resulted in ink cells which were rounded or triangular in cross section. Consequently, a planarizing layer is commonly applied over the color patterns, after they have been printed onto a substrate, to alleviate imperfections in coating smoothness or thickness uniformity due to the deposition process. The transparent planarizing layer also serves to protect against ion migration to and from the ITO layer and color pattern layer. The planarizing layer should be deposited to be as smooth and flat as possible.

Previously, a new method for providing such protective planarizing layers has been proposed by Corning Incorporated. This new method has been the subject of a commonly owned patent application Ser. No. 08/197,141, filed Feb. 16, 1994, entitled "Color Filters and Method of Printing", the specification of which is hereby incorporated by reference. In that application, a transfer layer 14 is provided onto a collector 16. Afterwards, the ink color cells are deposited using ink printing methods onto the transparent transfer layer. The ink color cells are then deposited onto a glass substrate, and sandwiched between the transfer layer and the glass substrate, in a process similar to that illustrated in FIG. 3.

After a planarizing layer has been deposited, a conductive layer such as indium tin oxide (ITO) is typically deposited over the planarizing layer. If the outside top or upper edges of the planarizing layer have sharp or square (90 degrees) edges, breaks or discontinuities can occur in the conductive (ITO) layer which is deposited over the planarizing layer. Consequently, it would be desirable to provide a method and apparatus for making color filters which is capable of producing planarizing layers which do not have sharp edges and therefore do not result in breaks in the ITO layer. It would further be desirable to produce such color filters using a method which is simpler and more efficient than prior art methods.

In addition to the ability to provide tapered or radiused edges on the color filters, it would also be desirable to be able to produce other contoured shapes on the planarizing layer or other top protective layer which is deposited over the color filter. For example, it would be desirable to be able to impart a microgroove pattern on the surface of the top protective layer. Such microgroove patterns can be used to orient the liquid crystal without the need for a separate alignment layer. Such microgroove patterns are discussed, for example, in "Regularity and Narrowness of the Intervals of the Microgrooves on the Rubbed Polymer Surface for LC Alignment" by Ito et al., SID 1992 digest, pages 393–396 (1992).

SUMMARY Of THE INVENTION

The present invention relates to methods for forming contoured planarizing layers on color filters for liquid crystal display applications, by forming the planarizing layer on a contoured collector device prior to deposition to a substrate. A transfer layer is provided on the contoured collector device, such as, for example, a collector roll or collector plate. The individual red, green, and blue color cells which make up the color filter are then deposited on the transfer layer to form a color filter pattern. Preferably, a black matrix pattern is formed ion the transfer layer prior to the colored ink cells. After formation of the color pattern on the transfer layer, the entire composite of transfer layer and color filter pattern is transferred from the collector device to the substrate so that the color filler pattern contacts the glass substrate. The transfer layer thus ends up on top of the color filter pattern, and thereby serves as a planarizing and/or protective layer for the color filter.

Because the collector device employed in the present invention has a shaped or Contoured surface, this contoured shape is imparted to the planarizing layer. Thus, if desired, a beveled or raised shape may be provided along the outside edges of the transfer layer by employing an appropriately shaped collector surface. In such cases, when the transfer layer is deposited onto the glass substrate (preferably along with the color cells which make up the color filter), the transfer layer serves as a planarizing and/or protective layer having a beveled or raised outer edge which slopes downwardly toward the outer edge of the glass substrate. To facilitate formation of the tapered region down to the glass substrate, the transfer layer is preferably sandwiched, during its formation, between the contoured collector roll and another roll having a relieved region on its outer periphery which approximates the depth of the color filter pattern. The relieved region on this roll forms an upraised region on the transfer layer directly opposite the taper edge region of the transfer layer. The color filter pattern is then deposited on the transfer layer within this upraised region of the transfer layer. In this way, the tapered edge region will surround the color filter pattern, and the color filter pattern will seem to be embedded within the transfer layer.

In one such embodiment of the present invention, prior to receiving the color cells which make up each pixel of the color filter, a transfer layer is deposited onto a contoured collector roll having a recessed central portion and outer edge beveling portions. The transfer layer is then contacted with a black matrix patterning roll which has a recessed pattern thereon which corresponds to the desired black matrix pattern. Preferably, this recessed pattern contains black matrix ink, and the black matrix ink is cured, or at least partially cured, prior to or during deposition to the transfer layer, to help retain the shape of the intaglio recessed pattern. Transfer of this cured black matrix pattern results in the formation of a raised black matrix pattern on the transfer layer. Preferably, the raised black matrix pattern is about 1 to 10 microns thick, more preferably about 2 to 6 microns thick, and most preferably about 3 to 4 microns thick above the remainder of the transfer layer.

Ink in intaglio and gravure print plates typically has a negative meniscus, the surface of the ink in the recessed intaglio pattern curving below the print plate surface. Consequently, the transfer layer is preferably liquid when it contacts the black matrix ink, so that it can adhere to the black matrix ink. The portion of the liquid transfer layer which contacts the black matrix ink is preferably cured while in contact with the black matrix ink and thereby removes the ink from the recesses of the intaglio print pattern. The region of the transfer layer corresponding to the outer edges of the resultant color filter (i.e., the tapered edges) is preferably masked so that it is not cured during this step, but rather remains liquid or tacky so that it will subsequently adhere to the substrate during a layer transfer step.

The black matrix patterning roll may alternatively be employed without black matrix ink, and the recessed pattern utilized to deform the color filter side of the transfer layer according to the black matrix ink pattern, to thereby form a raised pattern corresponding to the desired black matrix pattern. Such embodiments are unique in that both sides of the planarizing layer are being formed or shaped before the planarizing layer is deposited onto a color filter pattern substrate. The portion of the transfer layer contacting the patterning surface of the pattern roll is preferably cured, during the contacting step, so that the transfer layer permanently retains the pattern imparted by the roll. The red, green, and blue color dots are then deposited within the recesses of the raised pattern formed on the transfer layer. If desired, a black matrix ink pattern can be deposited ion top of the raised pattern or at another location within the liquid crystal display device. For example, the black matrix pattern could be deposited on the TFT substrate on top of the thin film transistor.

Ink printing methods are employed to deposit the red, green and blue color cells within the recesses formed by the raised pattern (which preferably is a raised black matrix pattern). Then, while the ink which makes up the color cells is still deformable, the resulting composite, which consists of the transfer layer, the color ink cells, and optionally a black matrix pattern, is transferred to the glass substrate. The soft, deformable color ink cells are compressed between the transfer layer and the glass during this deposition step. Because the color cell inks are plastically deformable during deposition to the substrate, they are compressed to a smoother, more uniform thickness and a smoother, more flat top than has been possible using prior art methods. The transfer layer aides in the deforming of the color ink, and also serves as a planarizing or protective layer, thereby helping to retain the more uniform ink cell shape. In this regard the present invention is contrary to the prior art, wherein color filter arrays were deposited onto a substrate first, followed by deposition of a planarizing layer and then a smoothing process in subsequent process steps. The colored ink cells and the remainder of the transfer layer (e.g. the region corresponding to the outer edges of the color filer) are preferably sufficiently hardened during transfer, or soon thereafter, to adhere the ink and transfer layer composite to the substrate and, at the same time, permanently retain the flattened shape of the color ink dot. This can be achieved, for example, by utilizing radiation curable inks and curing the ink simultaneous with the compression transfer. Adhesion to the glass substrate is provided by the pixel inks and that portion of the transfer layer that contacts the substrate (generally outside the color pixel ink regions), both of which are preferably cured by UV exposure While under compression during the final transfer. For tapered edge transfer on planarizing layers, the edge region of the transfer layer beyond where the pixel inks are printed will provide adhesion, provided this region retains sufficient tack to adhere to the substrate.

The transfer layer may be formed using, for example, those materials selected from the group consisting of polyimides, epoxides, acrylics, vinyl ethers, polyurethanes, polyesters, and acrylated or methacrylated acrylics, esters, urethanes, or epoxides, and other materials which are conventionally useful as planarizing layers in conventional color filter devices. A preferred material for the transfer layer is a radiation curable acrylate material, such as a radiation curable epoxy acrylate. The transfer layer is deposited onto a collector device as a thin film, typically less than 10 microns. Preferably, the transfer layer is formed of a radiation curable material to facilitate curing. In such cases the majority of the transfer layer is cured while receiving the ink patterns which make up the black matrix and color filter patterns. For taper edged transfer layers, the taper edge regions are preferably protected from curing radiation while receiving the ink pattern, so that they remain liquid until deposited to the substrate. These edge regions are then cured, along with the color ink pattern, during deposition to the substrate.

The present invention has several advantages over prior art methods. By tapering the edges of the transfer layer, breaks in the conductive film (which is typically ITO) are avoided. Because the planarizing layer is applied to the color filter during the color filter deposition process, no subsequent forming process is needed to apply or taper the outer edge of the planarizing layer.

By employing a smooth collector surface, the transfer layer will end up as a smooth top planarizing layer. However, it may be desirable in some cases for the transfer layer to be other than planar or smooth. In these cases, the desired topography can be imparted by first forming the inverse of the desired topography on the collector surface. For example, by appropriately shaping the collector roll to have a microgroove pattern thereon, the microgroove pattern will be imparted into the top of the transfer layer when it is deposited on the substrate. Such "microgroove" texture surfaces can be used to orient the liquid crystal material without the need for a separate alignment layer. Before the present invention, microgroove patterns were typically formed on the top layer of color filters using rubbing or abrasion techniques.

By microgroove pattern, it is meant that, for example, a plurality of parallel ridges or grooves are provided on the collector roll surface. These parallel microgrooves can be, for example, on the order of ten ridges or grooves per one micron length of collector roll surface, the ridges being approximately seven hundredths to several tenths of a micron high. Of course, if desired, the microgrooves can be smaller or larger, or more or less disperse than these dimensions.

DETAILED DESCRIPTION OF THE INVENTION

In the present invention, a transfer layer is deposited onto a collector device, such as a collector roll or collector plate.

The collector devices in accordance with the present invention comprise a contoured surface thereon so that, when the transfer layer is transferred from the collector device onto a substrate, the upper surface of the transfer layer is shaped according to the contoured Surface of the collector device. Thus, for example, the method of the present invention can be employed to make planarizing layers having tapered outer edges.

The red, green and blue color dot patterns are then deposited on the transfer layer, and the resultant composite, which consists of the transfer layer and color cells, is transferred in one step to the glass substrate. Prior to receiving the color dot patterns, a black matrix pattern is preferably deposited onto the transfer layer.

The transfer layer provides a unique surface on which to form each of the red, green and blue (or yellow, magenta, and cyan) color dot patterns and, if desired, the black matrix ink pattern. Forming the color filter pattern on a transfer layer enables the entire assembly, consisting of the transfer layer, black matrix pattern and color dot patterns, to be transferred to a substrate so that the color filter is sandwiched between the transfer layer and the substrate. Because the transfer layer acts as an in-situ formed planarizing layer, no subsequent operation is needed to form a planarizing layer. Such transfer layers are further discussed in commonly owned U.S. patent application Ser. No. 08/197,141, the specification of which is hereby incorporated by reference.

Figure 1:
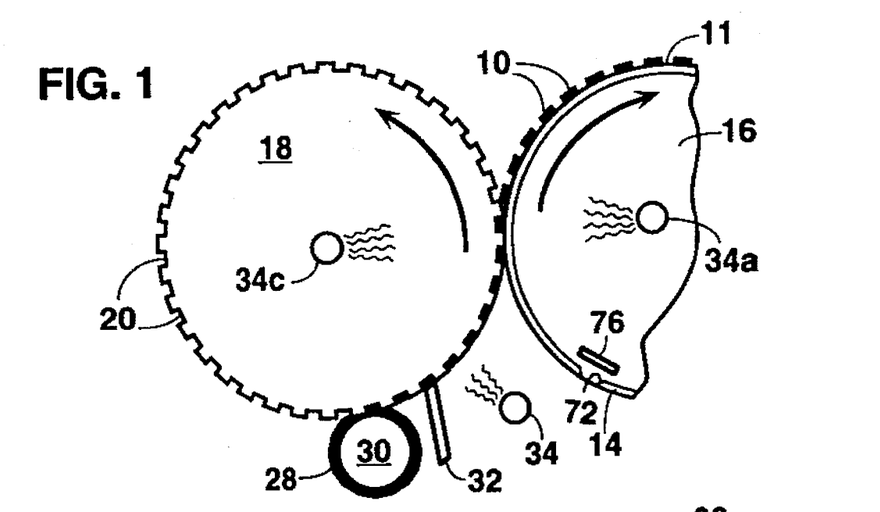
FIG. 1 illustrates a method and apparatus in accordance with the present invention.
Figure 5A:
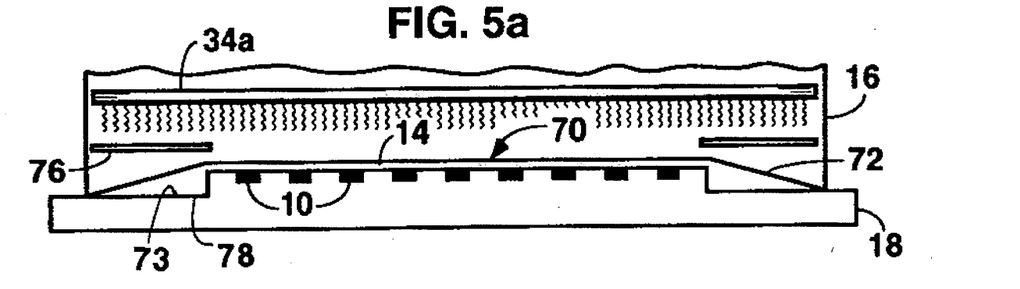
FIG. 5A is an axial cross-sectional view of a collector device, in accordance with the present invention, having a transfer layer thereon and receiving black matrix pattern in accordance with the process illustrated in FIG. 1.
Figure 5C:
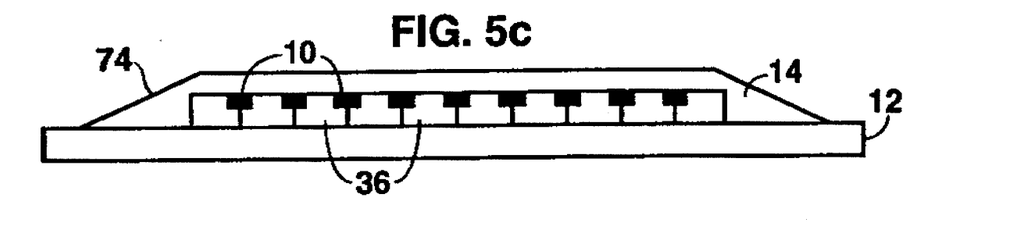
FIG. 5C is a cross-sectional view of a resultant color filter formed using the processes illustrated in FIGS. 5A and 5B.
Figure 6A:
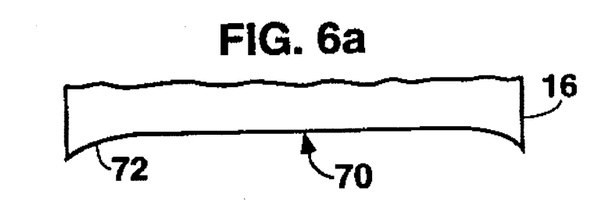
FIG. 6A is a cross-sectional view of an alternative collector roll in accordance with the present invention.

In one embodiment of the present invention, the transfer layer is applied onto a collector surface having a slightly recessed central portion which tapers radially outwardly from the surface of collector roll as one travels axially toward the outside edges of the collector roll. In FIGS. 5A and 6A, for example, the collector roll 16 illustrated has recessed central portions 70. Outwardly from these central portions (i.e., from the center of the roll), the surface of the collector roll 16 angles radially outwardly from the axis of the collector roll to form bevel forming regions 72. Utilizing the recessed collector surface illustrated in 5A and 6A, the transfer layer is deposited onto the collector surface, after which the color cells which make up the color filter are deposited on the transfer layer prior to transfer to the substrate. Preferably, the black matrix ink pattern is also deposited on the transfer layer (as illustrated in FIGS. 1 and 5A, and as will be further explained hereinbelow), prior to receiving the color cells. The entire composite can then be deposited, with the transfer layer on top, to form a color filter suitable for use in liquid crystal displays. In this way, the transfer layer will become the planarizing layer. The outer edges of the tapered transfer or planarizing layer are preferably formed so that the taper extends around the edges of the color filter pattern. For example, in FIG. 5a, the outer edges of the transfer layer are formed between the edge tapering region 72 of collector roll 16 and a relieved region 73 which is on black matrix patterning doll 18. The relieved region 73 forms upraised region 78 on transfer layer 14. This upraised region 78 will in effect surround the color filter pattern and contact the glass substrate when deposited thereto. Utilizing the collector roll 16 in conjunction with the black matrix patterning roller 18 illustrated in FIG. 5A will result in the formation of the tapered planarizing layer illustrated in FIG. 5C, wherein the bevel forming regions 72 of collector roll 16 form beveled or tapered regions 74 on planarizing layer 14.

Figure 6B:
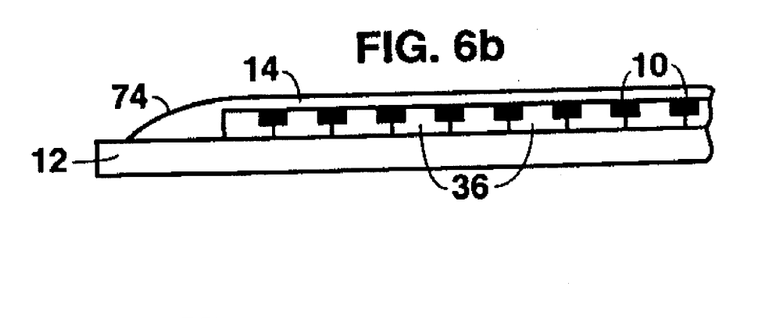
FIG. 6B illustrates a cross-section of the resultant color filter and planarizing layer formed utilizing the collector roll illustrated in 6A.

Likewise, utilizing the collector roll 16 illustrated in FIG. 6A will result in the formation of a planarizing layer having radiused taper edge regions 74, as illustrated in FIG. 6B.

Figure 5B:
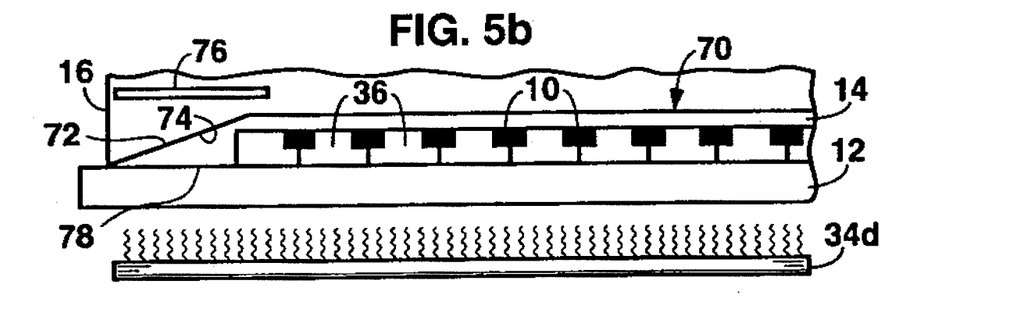
FIG. 5B is an axial cross-sectional view of the deposition of a transfer layer, black matrix pattern, and color filter array composite from a collector roll to a substrate in accordance with the present invention as illustrated in FIG. 3.

The collector roll 16 illustrated in FIG. 5A and 5B utilizes a distinctly angled taper, while the collector roll 16 illustrated in FIG. 6A utilizes a rounded or radiused taper. Such rounded or angled tapers can employ a wide variety of angles. Preferred taper angles include, for example, from about 20° to 70°, and more preferably from about 30° to 45°. It should be noted, however, that the invention is not limited to these particular angles, and that virtually any angle desired could be employed.

Figure 8A:
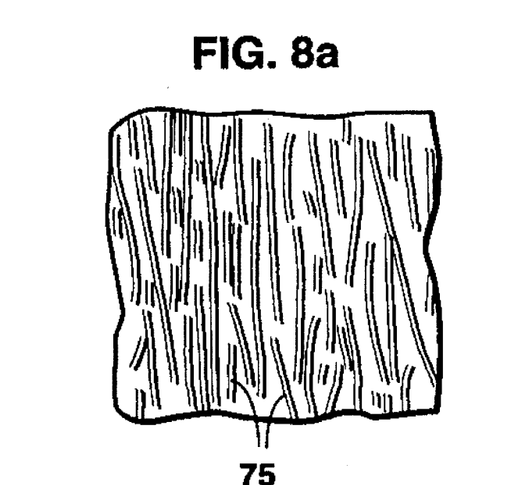
FIG. 8A is an enlarged partial perspective view of a collector surface having a microgroove pattern thereon.
Figure 8B:
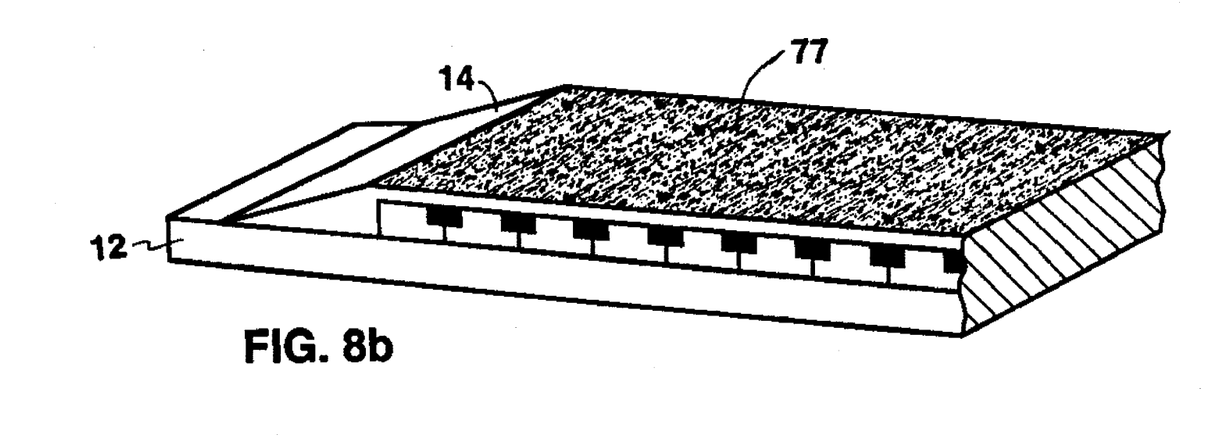
FIG. 8B is a perspective view of a color filter having a microgroove surface as a result of being deposited by the collector surface illustrated in FIG. 8A.

The contoured collector roll 16 of the present invention is not limited to providing angled or rounded tapers to planarizing layers, but also could be utilized to form a textured surface on the top of transfer layer 14. For example, any of the collector rolls 16 discussed herein can be provided with a surface having grooves or ribs 75 thereon which are substantially parallel to one another, as illustrated in FIG. 8A. In this way, the resultant planarizing layer 14, as illustrated in FIG. 8B, will have corresponding grooves or ribs 77 provided thereon.

Figure 8C:
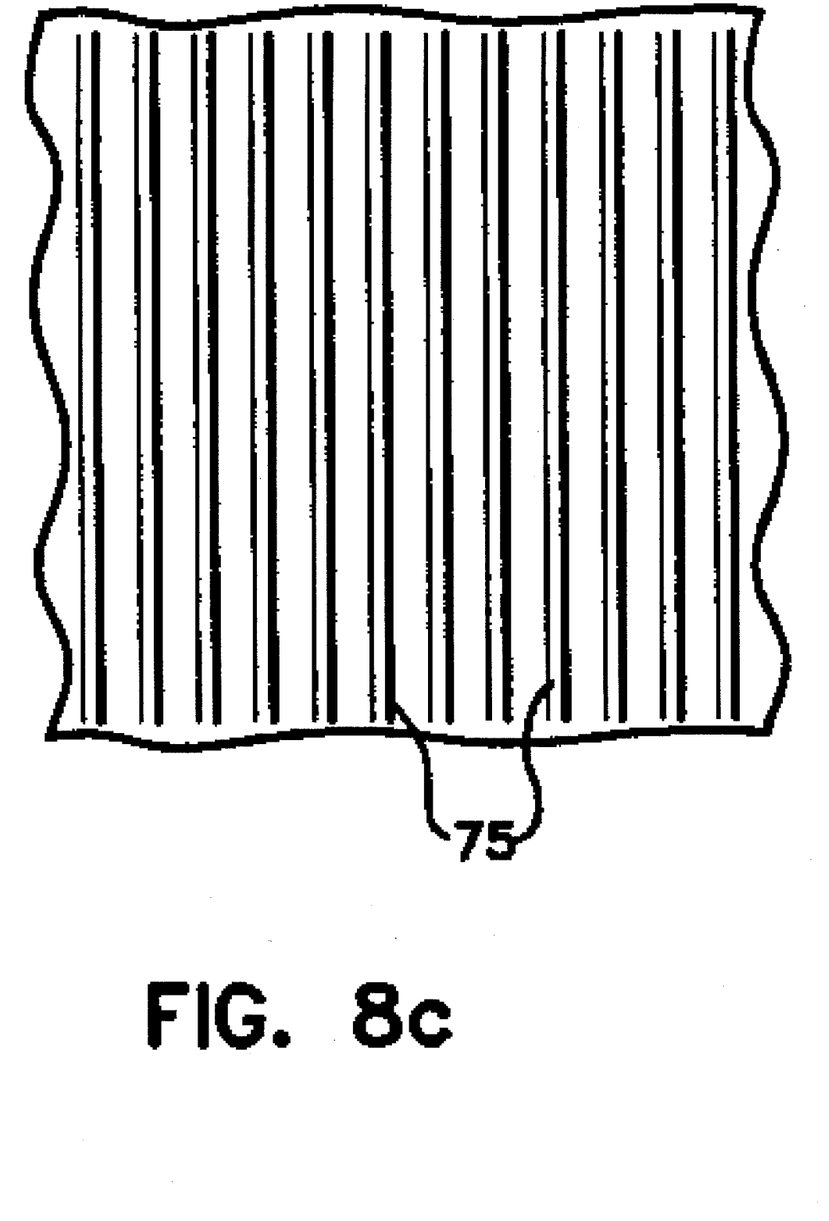
FIG. 8C is an enlarged partial perspective view of a collector surface having a preferred microgroove pattern thereon.

Preferably, the grooves or ribs 75 are straight and parallel to one another, as illustrated in FIG. 8C. In this way, the resultant planarizing layer 14 will have corresponding grooves or ribs 77 provided thereon which are also straight and parallel to one another.

Figure 7A:
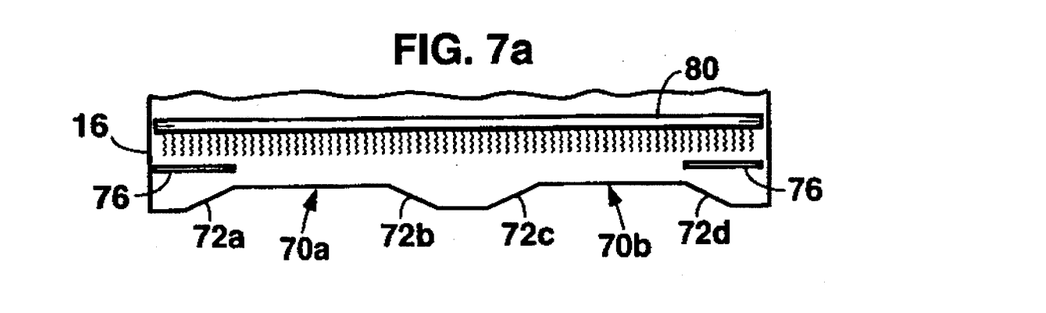
FIG. 7A is a cross-sectional view of an alternative collector roll in accordance with the present invention.
Figure 7B:
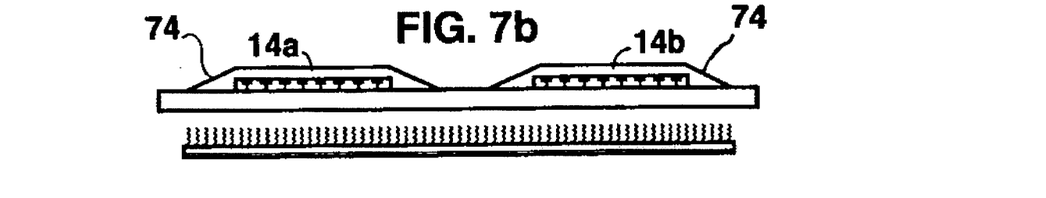
FIG. 7B illustrates a cross-section of the resultant color filter and planarizing layer formed utilizing the collector roll illustrated in 7A.

FIG. 1 illustrates an axial cross-sectional view of a process in accordance with the present invention. It should be noted that, to facilitate explanation of the present invention, none of the drawings discussed herein are necessarily of realistic comparative dimensions. Transparent transfer layer 14 is provided on collector roll 16. Collector roll 16 has a contoured surface. By contoured, it is meant that the peripheral surface is not flat (i.e., not perfectly cylindrical). For example, a collector roll such as the one illustrated in FIGS. 5A or 6A could be used to form a planarizing layer having tapered outer edges. In addition to the bevel forming regions 72 illustrated in FIGS. 5A, 6A, or 7A, as illustrated in FIG. 1, similar bevel forming regions 72 can be provided to bevel the leading and trailing edges of the planarizing layer. Alternatively, or additionally, collector roll 16 can be provided with ridges or grooves, as illustrated in FIG. 8A, so that the transfer layer 14 is in turn provided with a corresponding grooved pattern, as illustrated in FIG. 8B.

In FIG. 1, intaglio roller 18 is used as a black matrix ink patterning roll, in that it has an ink receiving recessed pattern 20 thereon which receives radiation curable, thermal wax, or solvent based black matrix ink 28. In a preferred embodiment ink applicating roller 30 applies radiation curable black matrix ink 28 into recessed pattern 20. Excess ink is removed from the pattern 20 by doctor blade 32. The ink is then cured or set within recessed pattern 20, such as, for example, by exposure to ultraviolet radiation from UV lamp 34, thereby forming a black matrix pattern 10 which will at least substantially retain the shape of the recessed pattern 20. Alternatively, in a preferred embodiment, intaglio roll 8 is constructed of radiation transparent material, and a UV light 34c is mounted therein to cure the black matrix ink while it is retained within recessed pattern 20. Such curing or setting of the black matrix ink can alternatively take place simultaneous with contact of the black matrix ink with the transfer layer. For example, the black matrix ink could be cured by radiation from UV light 34a, located within collector roll 16. When the curing or hardening of the black matrix ink is accomplished, the black matrix will retain the exact shape of recessed pattern 20. Black matrix patterning roller 18 is contacted with transfer layer 14 to transfer the cured or otherwise hardened black matrix pattern 10 from recessed pattern 20 of patterning roller 18 to transfer layer 14 on collector roll 16.

Transfer layer 14 may be applied using ink-type applicating rollers, as will be further discussed below. Transfer layer 14 may be partially cured prior to receiving the black matrix pattern. However, transfer layer 14 is preferably liquid and smooth prior to contacting the black matrix pattern. Ink in intaglio and gravure print plates typically has a negative meniscus, the surface of the ink curving below the print plate surface. Consequently, the transfer layer must be sufficiently, soft and tacky to adhere to the black matrix ink and remove the ink from the recesses of the intaglio print pattern. The portion of the transfer layer that contacts the black matrix is preferably cured during the transfer of the black matrix pattern to transfer layer 14. Such curing may be accomplished by utilizing ultraviolet radiation curable material to form transfer layer 14, and applying radiation, via ultraviolet (UV) light 34a, to transfer layer 14 during deposition of the black matrix pattern 10 to transfer layer 14. Although the UV light can be transmitted in a variety of ways, including through the collector, through the black matrix intaglio plate, or by focusing in the trailing (separation) nip between both, in a preferred embodiment the UV light 34a is mounted within collector roll 16, which is made of UV radiation transparent material to allow the radiation to be emitted therefrom. It should be noted that the radiation employed does not have to be ultraviolet, but could instead be visible, infrared, or other radiation, depending on the photoinitiator employed for the transfer layer.

Adhesion to the glass substrate is provided by the pixel inks which, for example, can be cured by UV exposure while under compression during the final transfer. For taper edged transfer layers, the edge region of the transfer layer beyond where the pixel inks are printed can also provide some adhesion, provided the transfer layer retains sufficient tack or liquidity at this process step to adhere to the glass. Consequently, as illustrated in FIGS. 1 and 5A, the portions of the transfer layer outside the color filter pattern (e.g., all portions adjacent to edge tapering regions of collector roll 16) preferably are masked by shadow masks 76 during the curing step used to cure the transfer layer to the black matrix ink. The remainder of the transfer layer (the edge pattern around the color filter) remains liquid and is subsequently cured during the final transfer of the composite to the substrate along with color pixel inks, as illustrated in FIG. 5B.

Using the embodiment illustrated in FIG. 1, wherein the black matrix pattern is cured while in the recessed pattern of intaglio roller 18, the resolution of the black matrix pattern is dependant upon the depth and shape of recessed pattern 20 and how well this shape is imparted to the black matrix pattern 10. By setting or curing black matrix pattern 10 while it is still contained within recessed pattern 20, the black matrix pattern will necessarily acquire the square edges and corners of the recessed pattern, thus avoiding the jagged, triangular or rounded corners and edges which are typical of conventional ink printing techniques.

Figure 2:
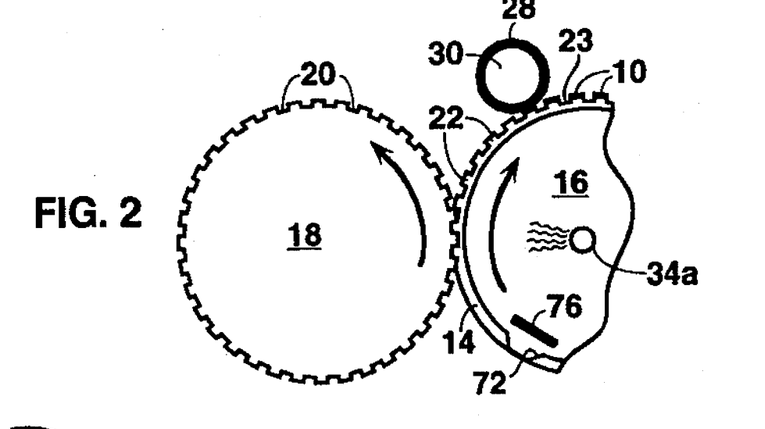
FIG. 2 illustrates an alternative method and apparatus in accordance present invention.

Alternatively, the apparatus illustrated in FIG. 1 could be used to contour the color filter side (i.e., the side which contacts the colored inks which make up the color filter) of the transfer layer, rather than deposit the black matrix thereto. To do so, intaglio roll 18 can be utilized without ink 28 so that the recesses 20 deform the transfer layer 14 to form recesses 23 in the transfer layer 14. FIG. 2 illustrates this alternative method in accordance with the present invention. Recessed pattern 20 on roller 18 corresponds to the desired black matrix pattern. Consequently, the resultant raised pattern 22 formed on transfer layer 14 by contact with the recesses 20 will correspond to the desired black matrix pattern 10. Transfer layer 14 will have to be hardened sufficiently to retain the embossing pattern obtained from roll 18. This can be accomplished by utilizing thermoplastic inks and cooling the transfer layer, at the point of contact with roll 18, to set the ink. Alternatively, and more preferably, radiation curable inks are employed, and radiation is emitted from ultraviolet light 34a through collector roll 16 to cure the transfer layer 14 during the embossing operation. In accordance with the present invention, collector roll 16 is again a contoured roll, such as, for example, is illustrated in FIGS. 5A, 6A, 8A or 8C. If a taper edged collector roll 16 is employed, it preferably is masked, as explained above with respect to FIG. 5A, to protect the taper edges from being cured during the transfer of the black matrix pattern to the transfer layer. Thus, while the contoured surface of collector roll 16 shapes one side of transfer layer 14, the other side of transfer layer 14 is, shaped by recessed pattern 20 of intaglio roller 18. Consequently, this particular process is especially unique, in that both sides of the planarizing layer would be contoured or shaped before the planarizing layer was deposited onto a substrate. If desired, black matrix ink may be applied from black matrix ink applicator roll 30 to upraised pattern 22 to form raised black matrix pattern 10.

Alternatively, the black matrix ink 28 can be applied at a different location in the process of manufacturing the liquid crystal display panel. For example, the black matrix ink can be applied on the other (TFT) glass substrate. If desired, for example, the black matrix pattern can be deposited on top of the thin film transistor. For applications in which the black matrix pattern is deposited on the TFT substrate, it is felt that formation of the raised pattern 22 on transfers layer 14 is advantageous, in that it separates and aligns the various color cells with the black matrix pattern. By then registering the black matrix pattern 10 to be aligned with raised pattern 22, when one looks down at the resultant liquid crystal display, the color cells will appear to be within the black matrix pattern.

Completion of the color filter involves formation of the color pixels. Each color pixel typically consists of a red, green, and blue subpixel (subpixels are also herein referred to as color cells). In all of the above described embodiments, after the raised pattern 22 (or raised black matrix pattern 10) has been applied to transfer layer 14, the red, green and blue color cells of the color filter pattern are applied to transfer layer 14 within the recesses 11 formed by raised pattern 10. Preferably, the red, green and blue color cells are deposited within black matrix pattern 10 using typographic ink printing techniques. After deposition of the red, green and blue color ink cells within raised pattern 10, the entire composite, which consists of transfer layer 14, raised pattern 10, and red, green and blue color cells 36, is transferred to a glass substrate 12.

Figure 3:
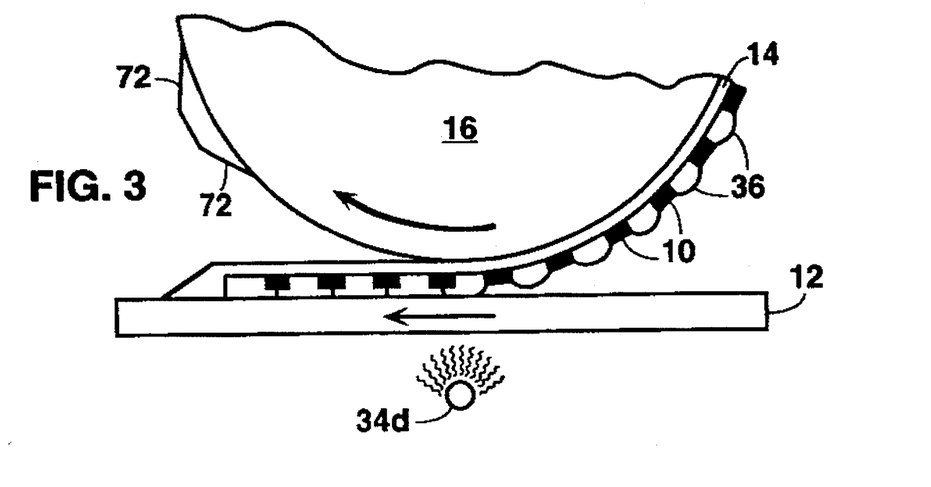
FIG. 3 illustrates the deposition of a transfer layer, along with a black matrix pattern and color ink dot pattern, to a glass substrate.

FIG. 3 illustrates the deposition of a black matrix pattern 10, color filter pattern 36, and transfer layer 14 from collector roll 16 to a glass substrate 12. Collector roll 16 again employs a contoured surface such as is illustrated in FIGS. 5A, 61A, 8A, 8C or some other contoured surface. The composite illustrated in FIG. 3 consists of black matrix pattern 10 formed using the method illustrated in FIG. 1, as well as the color ink cells 36 which comprise the color filter pattern. During deposition of the composite to the substrate, the ink cells 36 which comprise the red, green and blue color cells are preferably in a liquid or otherwise deformable state. Consequently, the ink cells are squeezed, during the deposition, between transfer layer 14 and glass substrate 12, and thereby deformed to a smoother, more uniform ink dot shape and thickness. This more uniform shape and thickness is retained, preferably by curing simultaneous to the transfer operation. Such curing can be accomplished via UV light 34d, which is positioned to emit radiation through the glass substrate, as illustrated in FIG. 3 and FIG. 5B. In addition to curing the deformable color ink dots, the taper edges (if formed) are also preferably cured at this time. Such a curing operation is best illustrated in FIG. 5B, which shows UV light being emitted from UV light source 34d to simultaneously cure the color ink cells 36 and the outer edge regions of transfer layer 14.

Figure 4:
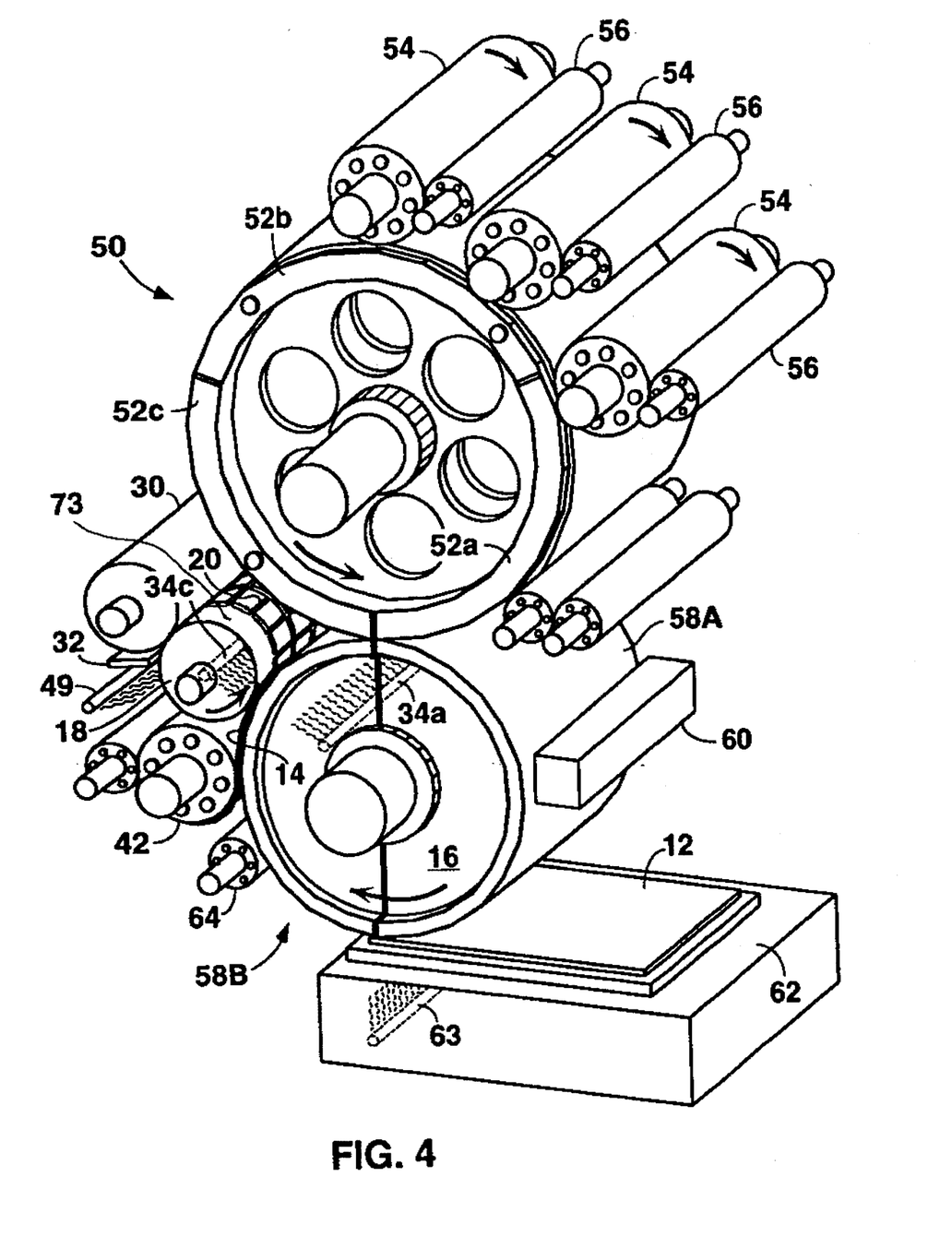
FIG. 4 illustrates a preferred embodiment of the present invention.

FIG. 4 illustrates a preferred apparatus for carrying out the method described above with respect to FIGS. 1 and 3. The FIG. 4 apparatus includes transfer layer applicator roll 42, which applies a relatively uniform thickness transparent transfer layer 14 to collector roll 16 prior to receiving the multicolored ink pattern. Collector roll 16 has a contoured surface thereon. For example, the contoured collector roll 16 can be designed like the collector roll surfaces illustrated in FIGS. 5A or 6A to produce a planarizing layer having tapered outer edges, or like 8A to produce a microgroove pattern, or a combination of such contoured collector surfaces.

After the formation of transfer layer 14, a raised black matrix pattern is deposited from black matrix imaging roll 18 onto transfer layer 14. Black matrix imaging roll 18 has a recessed pattern 20 thereon corresponding to the desired black matrix pattern, and a relieved region 73 corresponding to the area of the desired tapered region. Recessed pattern 20 receives black matrix ink from black matrix inking roll 30. Excess ink is removed from recessed pattern 20 by doctor blade 32 to provide a uniform thickness of ink within recessed pattern 20. The black matrix ink is then at least partially cured or set while still contained within recessed pattern 20 of black matrix imaging roll 18. This may be accomplished by curing black matrix pattern 10 either prior to or simultaneous to transfer to transfer layer 14. For example, in one embodiment, black matrix imaging roll 18 is formed from a radiation transparent material, and an ultra-violet light source 34c is provided within black matrix imaging roll 18 to emit ultra-violet radiation and thereby cure the black matrix pattern. Alternatively, ultra-violet light source 49 may be positioned to emit ultra-violet radiation onto the black matrix pattern roll 18 and thereby cure black matrix ink pattern 10 while it is retained within the recessed pattern 20 of black matrix patterning roller 18. Alternatively, the ink may set by appropriate cooling of a thermal wax formulation, drying of a solvent based ink, or a combination of such curing mechanisms.

The cured black matrix pattern 10 is then transferred from black matrix imaging roll 18 to transfer layer 14. The transfer layer 14 is preferably liquid prior to the deposition of the black matrix pattern thereon, so that it is tacky or sticky enough to remove the black matrix pattern from intaglio roller 18. While in contact with the black matrix pattern 10, the transfer layer 14 is preferably cured or otherwise hardened so that it is sufficiently solid to substantially retain its shape, and also so that it removes the black matrix pattern 10 from the roll 18. Such curing may be accomplished by designing collector roll 16 to be transparent and emitting radiation from ultraviolet light 34a located within collector roll 16. If the contoured collector roll 16 employs a taper edged design, these taper edges are preferably masked from the UV radiation as described above with respect to FIG. 5B. The radiation emitted from UV light 34a cures transfer layer 14. After the black matrix pattern has been formed on transfer layer 14, the red, green and blue color cell patterns which make up the remainder of the color filter pattern are deposited on transfer layer 14. The following is a description of how the red, green, and blue color cells are deposited within the recesses 11 formed by black matrix pattern 10 on transfer layer 14, all of which is supported by collector roll 16.

In the apparatus of FIG. 4, a single imaging pattern roll 50, having multiple printing patterns thereon, is utilized to apply the red, green and blue color dot patterns. Pattern roll 50 may be virtually any form of roll capable of producing an ink pattern or image, including lithographic, typographic, waterless lithographic, and so forth. Preferably, pattern roll 50 is a flexographic or other type of typographic printing roll. Alternatively, the color may be transferred from a typographic print plate rather than a roll.

In FIG. 4, pattern roll 50 is a typographic roll having three typographic patterned ink receiving regions 52a, 52b, and 52c, thereon which receive ink to form the blue, green and red color ink patterns, respectively. Inking rolls 54 apply the correct colored ink from ink metering rolls 56 to each of the three ink receiving regions 52a, 52b and 52 of pattern roll 50. The inking rolls 54 are movable to and from a contacting position with pattern roll 50, to enable each colored ink to be applied only to the appropriate ink receiving region.

Collector roll 16 has two receiving surfaces: 58A and 58B. The separate colored ink patterns developed on ink receiving regions 52a, 52b and 52c of pattern roll 50 are printed onto receiving surfaces 58A and 58B of collector roll 16 in registration. This means that each separate colored ink pattern from region 52a, 52b and 52c prints its respective ink pattern on receiving surface 58A and 58B of collector roll 16 in a specific geometric relation with each of the other colored ink patterns, each ink color being deposited within its respective compartment within the black matrix pattern.

In FIG. 4, transfer layer applicator roll 42 is depositing a transfer layer 14 to receiving surface 58B of collector roll 16 and black matrix applicator roll 18 is depositing a cured raised black matrix pattern 10 on transfer layer 14. Next, red ink pattern region 52c will deposit the red color dot pattern onto receiving surface 58B of collector roll 16, and green ink pattern region 52b will deposit the green color dot pattern onto receiving surface 58A. On the next rotation of collector roll 16, blue ink pattern region 52a will deposit the blue color dot pattern onto receiving surface 58B, and red ink pattern region 52c will deposit a red ink pattern onto receiving surface 58A. On the next rotation of roll 16, green ink pattern region 52b will deposit a green color dot pattern onto receiving surface 58B, and blue ink pattern region 52a will deposit a blue color dot pattern onto receiving surface 58A. At this point, a complete color filter image will be present, with each of the colored inks deposited within the raised black matrix pattern, all of which are on transfer layer 14, which in turn is supported by receiving surface 58B of collector roll 16. The color filter image is inspected at inspection station 60, which may employ, for example, an image analysis or laser scanning type inspection system. If the multicolored pattern does not pass inspection, it is rejected and cleaned off of compartment 58B by cleaning roller 64. If the multicolored pattern passes inspection, glass substrate 12, which is supported on vacuum chuck 62, is contacted with collector roll 16 and the resultant composite, which consists of transfer layer 14, black matrix pattern 10, and the red, green, and blue color cells, is transferred to the substrate.

Utilizing a method as illustrated by FIGS. 1–4, the collector rolls illustrated in FIGS. 5A and 6A will result in color filter patterns such as those illustrated in FIGS. 5B and 6B, respectively. FIGS. 5A and 6A illustrate collector rolls 16 for forming a single tapered color filter planarizing layer. Alternatively, the collector roll 16 can be designed to produce planarizing layers for several different color filters at a time after which the substrate can be cut into sections to separate the color filter patterns from one another. For example, in the embodiment illustrated in FIG. 7A, the collector roll 16 includes two separate recessed regions 70a and 70b for accepting the transfer layer, as well as bevel forming areas 72a, 72b, 72c, and 72d and UV light 80. Bevel forming areas 72a and 72b cooperate with recessed region 70a to form a planarizing layer 14a for a first color filter, while bevel forming areas 72c and 72d correspond with recessed region 70b to form a planarizing layer 14b for a second color filter. In this way, two or more color filter patterns can be produced using a single collector roll 16.

Transfer of the transfer layer/multicolored ink pattern composite from collector roll 16 to the substrate preferably takes place while the multicolored image is still deformable. In this way, the inks are compressed, during the transfer, between transfer layer 14 and the substrate 12, as illustrated in FIG. 3. In a preferred embodiment, the ink employed for the color ink cells is radiation curable, vacuum chuck 62 is made of a transparent material, and an ultraviolet light 63 is provided within vacuum chuck 62 to emit radiation through substrate 12. The ink is cured while under compression from the transfer deposition operation, causing the ink cells to retain the more uniform shape created during the transfer operation.

Registration requirements for liquid crystal display color arrays is typically on the order of plus or minus 30 microns, with future requirements expected to be about plus or minus 5 microns. Because of these extremely demanding registration requirements, a printing machine like that shown in FIG. 4, which utilizes a single pattern roll 50 to form and deposit the various color patterns to a single collector roll 16, is very useful.

In a preferred apparatus for carrying out the methods of the present invention, the apparatus illustrated in FIG. 4 is mounted on its side (i.e., by vertically mounting the printing rolls). By vertically mounting the printing rolls, they may be removed vertically (in an axial direction, relative to the roll) from the printing apparatus, as opposed to conventional horizontally disposed rollers, which must be removed horizontally. In addition, if desired, the printing rolls can be supported by a single bearing system located beneath each print roll, rather than two (one at each end). Because this leaves the opposite end (i.e., the upper end of each print roll free, these print rolls can be removed and replaced by moving the rolls in a vertical direction. Consequently, changing print rolls is greatly facilitated.

For embodiments in which an ink (both black matrix and color ink) is cured, the ink is preferably formulated to be radiation curable. By curable, it is meant that the ink cross-links. By radiation curable, it is meant that the ink cross-links when exposed to appropriate radiation. This is regardless of whether the ink also has hot melt thermoplastic properties in the uncured (uncross-linked) state or incorporates a solvent. In the embodiment illustrated in FIG. 4, vacuum chuck 62 is capable of transmitting radiation which is suitable for curing the particular ink employed. For example, vacuum chuck 62 could have an ultraviolet (160–400 μm) or visible (400–700 μm) radiation source therein, and thereby be capable of emitting ultraviolet or visible radiation. Alternatively, the ink cad be exposed to the radiation by other methods, such as by aiming a radiation source at either the trailing (separating) nip edge or compressed nip region formed between the roll and the substrate. While such curing may be done by radiation curing using conventional radiation emitting lamps, alternatively a laser could be used, guided by mirrors, to cure (crosslink) the ink sufficiently. In order for the dot to be cured in the deformed state by collector roll 16 during deposition to the substrate, the surface area of the contact area between the collector roll and the substrate must be large enough, for a particular roll rotation speed, to allow for an appropriate amount of curing while the dot is still being compressed in a flattened state. This contact area, called the "foot", is typically about a 5 to 25 mm wide contact area on the glass.

In Carrying out the present invention, conventional radiation-curable inks are generally preferred over thermoplastic inks, partly because they can be printed at lower viscosities, which helps in printing the thin color cells. Also, it is more difficult to control the pattern registration of hot melt thermoplastic inks, as they requite extremely tight thermal tolerances to control pattern dimensions. In addition, radiation curable inks are easily cured during compression transfer operations in accordance with the invention. Thermoplastic inks do have at least one advantage, in that they can be formulated to set up immediately upon deposition to a substrate or transfer roll having a lower temperature, resulting in less pinholes, film non-uniformities and other such defects which can be caused by inadequate wetting of transfer surfaces. Consequently, another preferred type of ink is one that displays both thermoplastic and radiation curable properties. Such an ink is one which is formulated to be thermoplastic until printed to the substrate, at which point it can be cured by exposure to appropriate radiation. By cured, it is meant that the ink is to some extent cross-linked Cross-linking of the ink increases its durability and resistance to higher temperatures, which is preferable due to the temperatures the color filter will be exposed to in subsequent processing steps.

For the black matrix ink, another preferred type of ink is a solvent based formulation in which a volatile solvent is incorporated into the ink to lower the viscosity during inking and doctoring, the solvent being chosen so that it is compatible with the ink and readily evaporated from the thin (preferably 2 to 5 micron) black matrix pattern in the intaglio plate before contact with the transfer layer. The ink may then undergo crosslinking during subsequent radiation or thermal cure.

The inks may undergo final curing, during or after deposition to the substrate, by exposure to either radiation, thermal, moisture or other type of curing process, to achieve a hard, tack-free, durable state.

Although the invention has been described in detail for the purpose of illustration, it is understood that such detail is solely for that purpose and variations can be made therein by those skilled in the art without departing from the spirit and scope of the invention which is defined by the following claims.

For example, in the embodiments illustrated herein, transfer layer 14 is applied to a collector roll 16. However, the present invention is not limited to collector rolls, and thus other types of collector devices, such as plates, could also be utilized. These contoured rolls are not limited to bevel shapes, but could be virtually any shape which one wanted to impart via the collector roll to the transfer or planarizing layer. Likewise, while the embodiments illustrated herein utilize pattern rollers, flat pattern imaging plates could also be employed. Transfer layer 14 may be applied using any technique, and preferably is applied using ink applicating techniques. In addition, an alternative to the process illustrated in FIG. 4 is to print the three sets of color cells directly on the collector roll 16 from individual pattern rolls 54 or from flat imaging plates. In this alternative configuration, there would be no pattern roll 50.

What is claimed is:

1. A method of forming a contoured planarizing layer on a color filter, comprising:

forming a transfer layer on a collector device having at least one contoured surface pattern comprising a central region which is recessed from an outer region of said surface pattern, and transferring said transfer layer onto a substrate over a plurality of colored ink patterns which make up a color filter pattern, thereby forming said contoured planarizing layer.

2. The method of claim 1, further comprising, prior to said transferring step:

depositing a plurality of colored ink patterns on said transfer layer to form a colored ink pattern/transfer layer composite; and said transferring step comprises transferring said composite to said substrate so that the colored ink patterns contact said substrate.

3. The method of claim 2, further comprising, prior to said depositing step, applying a black matrix ink to said transfer layer.

4. The method of claim 3, wherein said applying a black matrix ink step comprises:

providing a patterning device comprising a recessed imaging pattern;

depositing black matrix ink into said recessed imaging pattern; and transferring said black matrix ink from said recessed imaging pattern to said transfer layer to form a black matrix pattern.

5. The method of claim 4, further comprising, prior to said transferring said black matrix ink step, at least partially curing said black matrix ink to enable said black matrix ink to substantially retain the shape of the recessed imaging pattern.

6. The method of claim 5, further comprising hardening said transfer layer during said transferring said black matrix ink step.

7. The method of claim 6, wherein said transfer layer comprises a radiation curable material, and said hardening step comprises curing said transfer layer.

8. The method of claim 4, wherein said patterning device comprises a black matrix patterning roller having said recessed imaging pattern thereon corresponding to said desired black matrix pattern.

9. The method of claim 2, wherein during said transferring of said composite, said colored ink patterns are deformable, and said method further comprises:

deforming said colored ink patterns to a more uniform film thickness than was present prior to said transfer.

10. The method of claim 1, wherein said collector device comprises a collector roll, and said forming a transfer layer step comprises forming said transfer layer on said collector roll.

11. The method of claim 1, wherein said collector device comprises at least two contoured surface patterns, each pattern comprising a central region which is recessed from an outer edge region of the collector device, and each contoured surface pattern corresponds to a separate planarizing layer for a separate color filter, and said outer edge regions are tapered toward the substrate, and said method further comprises cutting the substrate into sections to separate said separate color filter patterns from one another.

12. The method of claim 1, wherein said transfer layer is selected from the group consisting of polyimides, epoxides, acrylics, vinyl ethers, polyurethanes, polyesters, and acrylated or methacrylated acrylics, esters, urethanes, or epoxides.

13. A method of forming a contoured planarizing layer on a color filter, comprising:

sandwiching a planarizing material between a color filter pattern and a contouring device having at least one contoured surface pattern thereon, said contoured surface pattern comprising at least one central region which is recessed from an outer region of said surface pattern.

14. The method of claim 13, wherein said recessed central region in said sandwiching step ends in at least one bevel forming region, said at least one bevel forming region extending upwardly and outwardly from said central recessed region.

* * * * *